United States Patent [19]

Bourne

[11] Patent Number: 5,645,879
[45] Date of Patent: *Jul. 8, 1997

[54] FIRMNESS IN PROCESSED VEGETABLES AND FRUITS

[75] Inventor: Malcolm C. Bourne, Geneva, N.Y.

[73] Assignee: Cornell Research Foundation, Inc., Ithaca, N.Y.

[*] Notice: The term of this patent shall not extend beyond the expiration date of Pat. No. 5,599,572.

[21] Appl. No.: 465,740

[22] Filed: Jun. 6, 1995

Related U.S. Application Data

[62] Division of Ser. No. 262,353, Jun. 20, 1994, which is a continuation of Ser. No. 135,575, Oct. 13, 1993, abandoned, which is a continuation of Ser. No. 22,433, Feb. 16, 1993, abandoned, which is a continuation of Ser. No. 540,399, Jun. 19, 1990, abandoned, which is a continuation of Ser. No. 279,907, Dec. 5, 1988, abandoned.

[51] Int. Cl.$^6$ .............................. A23B 7/005; A23B 7/06; A23B 7/10
[52] U.S. Cl. .................... 426/321; 426/325; 426/508; 426/509; 426/524
[58] Field of Search ................................ 426/321, 325, 426/508, 509, 524

[56] References Cited

U.S. PATENT DOCUMENTS 4,521,439  6/1985  Bengtsson et al. .................... 426/615

OTHER PUBLICATIONS

Bourne, M. C., Abstract No. 30, 196th ACS Meeting, Division of Agriculture and Food Chemistry, Sep. 26, 1988.
Bourne, M. C., Abstract No. 225, 1988 Annual Meeting, Institute of Food Technologies, New Orleans, Monday Jun. 20, 1988.
Bourne, M. C., J. Food Sci. 37, 751–753 (1972).
LaCroix, P., Memoire En Vue D'Obtenir Le Diplome D'Ingenieur Enshana, Sep. 23, 1988.
Canet, W., et al, Int. J. Food Sci. Technol. 22: 273–277 (1987).
Hoogzand, C., et al, Food Technol. 15: 160–163 (1961).
Nagel, C. W., et al, Food Research 19: 613–616 (1954).
Sistrunk, W. A., et al, Food Technol. 14: 357–362 (1960).
Taylor, A. J., et al, J. Sci. Food Agric. 32: 134–138 (1981).
Van Buren, J. P., J. Texture Stud. 10: 1–23 (1979).
Hsu, C. P., et al, J. Food Sci. 30: 583–588 (1965).
Lee, C. Y., et al, J. Food Quality 11, 279–287 (1988).
Lee, C. Y., et al, J. Food Sci. 44: 615–616 (1979).
Gardner, W. H., et al, Food Acidulants, pp. 163–165 and 167, Allied Chemical Corporation, 1966.
Van Buren, J. P., J. Food Sci. 39, 1203–1205 (1974).
Lopez, A., A complete Course in Canning, 11th Edition, Book I, 322–323, 478–482, The Canning Trade, Baltimore, 1981.
Wills, R. B. H., et al, Postharvest, pp. 6–9, New South Wales University Press, 1981.
Bourne, M. C., J. Food Sci. 52, 667, 668, 690 (1987).
Huang, Y. T., et al, J. Texture Stud. 14, 1–9 (1983).
Van Buren, J. P., et al, Food Technol. 14, 233–236 (1960).
Van Buren, J. P., et al, J. Food Sci. 27, 291–294 (1962).

*Primary Examiner*—Anthony J. Weier

[57] ABSTRACT

Firmness of processed canned foods including fruits and vegetables has been markedly improved by subjecting the fruit or vegetable to a low temperature blanching step at a temperature in the range of 125° F. to 160° F. and preferably from about 140° F. to 155° F. prior to conventional sterilization. Determination of blanch temperature conditions to produce optimum firmness in the processed food is made by first obtaining firmness values of specific foods at various blanch and hold temperatures and thereafter plotting the rate of firmness increase (Newtons/minute) against blanch temperatures. Preferred conditions, which vary for different foods, are obtained from individual plots for each food. Synergistic improvement of firmness results by combining the low temperature blanching with food grade acid (pH) and/or calcium salt additions.

7 Claims, 7 Drawing Sheets

FIRMNESS IN PROCESSED VEGETABLES AND FRUITS

This is a divisional of copending Ser. No. 08/262,353, filed Jun. 20, 1994, which is a continuation of Ser. No. 08/135,575, filed Oct. 13, 1993, now abandoned, which is continuation of Ser. No. 08/022,433, filed Feb. 16, 1993, now abandoned, which is a continuation of Ser. No. 07/540,399, filed Jun. 19, 1990, now abandoned, which is a continuation of Ser. No. 07/279,907, filed Dec. 5 1988, now abandoned.

The present invention relates to improved methods of food processing. More specifically it relates to improving the firmness of fruits and vegetables which are processed by blanching followed by sterilization.

BACKGROUND OF THE INVENTION

Thermal processing is one of the most important methods mankind has developed for extending the storage life of perishable foodstuffs. However, the thermal process causes some destruction of the food qualities. Nutritional value, texture, color and flavor are usually damaged to a greater or lesser extent during the thermal process.

The soft texture of most canned vegetables is recognized as a major quality defect. It is probably one of the main reasons why the sales of canned vegetables are declining while sales of fresh vegetables are increasing. Protecting food against excessive softening caused by thermal processing is an on-going problem.

VanBuren et al, *J. Food Sci.*, 27:291 (1962), have processed snap beans using a low temperature blanch at about 170° F. before canning to give a firmer-textured canned snap bean as compared to the conventional blanching at 200° to 212° F. The vegetable canning industry typically uses a blanch temperature of about 170° F. for snap beans. Similarly, Lee et al, *J. Food Sci.*, 44:615 (1979) have shown that a 170° F. blanch gives firmer textured canned carrots.

Large quantities of vegetables and fruits are preserved by canning. This technology requires enclosing the product in hermetically sealed containers and heating at a specified temperature for a specified time to destroy all microorganisms inside the container. Products with a pH above 4.5 require a substantial heating regime to obtain commercial sterility. For example, green beans packed in brine in 1 lb cans require 22 minutes at 240° F. or 13 minutes at 250° F. This heavy heat treatment cannot be compromised because microorganisms of public health significance, such as *Clostridium botulinum*, require this degree of heat treatment to be destroyed. Unfortunately, this amount of heat causes great damage to the food texture. Most canned vegetables have a softer than desirable texture.

The present invention relates to a process for improving fruit and vegetable firmness, particularly in thermal processed foods.

BRIEF DESCRIPTION OF THE INVENTION

One object of the present invention is to improve the firmness of canned fruits and vegetables subjected to thermal sterilization processing by predetermining optimum low-temperature blanch temperatures for each food from softening curves and a plot of the rate of firmness increase with blanch temperature.

Another object is to provide a process to prepare canned fruits and vegetables having improved firmness qualities by using lower blanch temperatures and optimum holding times prior to sterilization to replace or as an adjunct to conventional processing methods.

Another object is to maximize the factors that contribute to food firmness by selecting conditions for increasing the firmness and simultaneously countering conditions which have the effect of softening the food.

Yet another object relates to a low temperature blanching process for maintaining the firmness of fruits and vegetables subjected to sterilization processing which comprises blanching the fruits or vegetables at a temperature of from about 125° F. to about 160° F. prior to sterilization for a time sufficient to cause said fruit or vegetable to remain firmer after sterilization as compared to said fruit or vegetable sterilized without said blanching step.

DETAILED DESCRIPTION OF THE INVENTION

Figure 1:
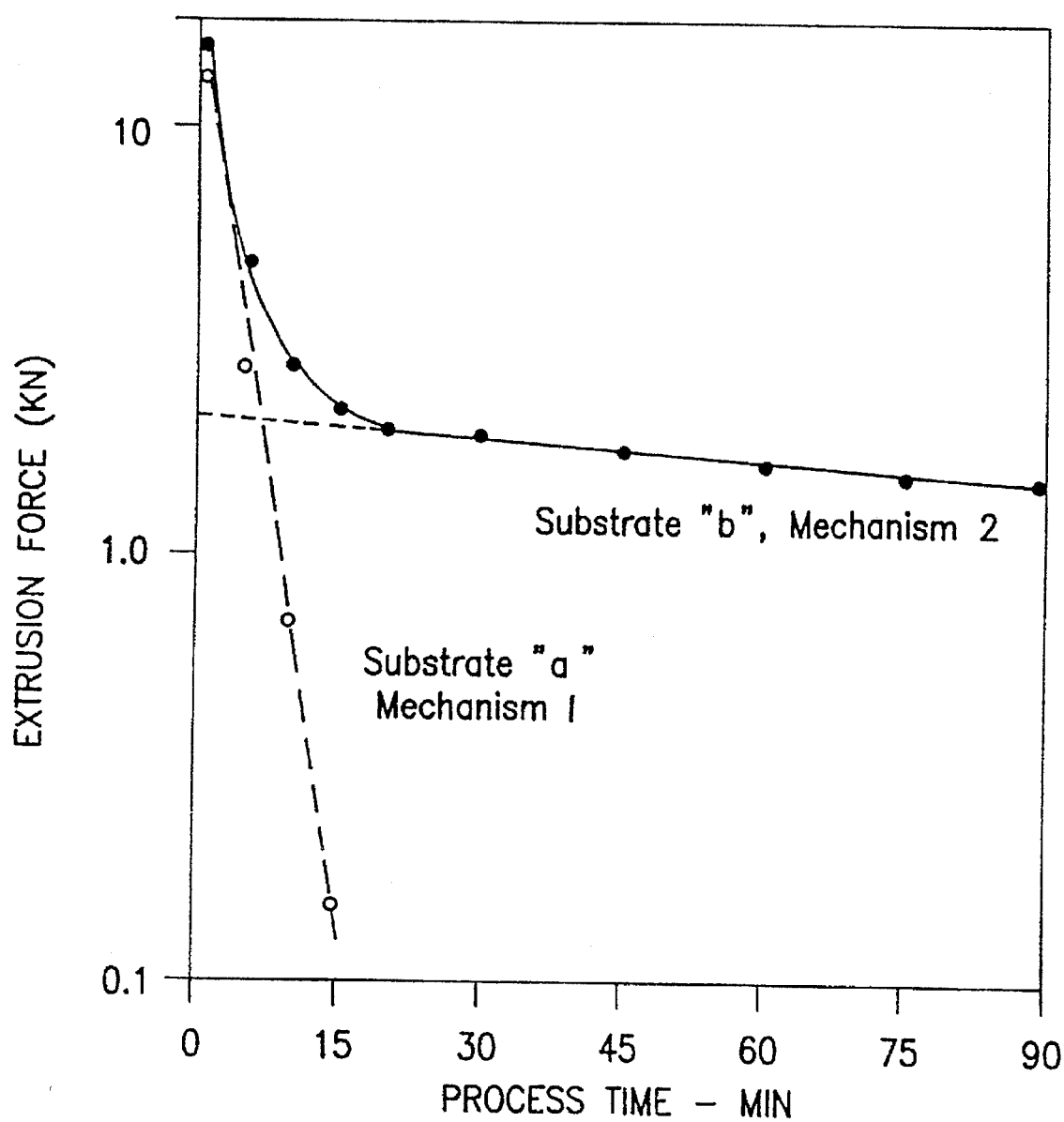
FIG. 1 is a softening curve graph of log extrusion force (KN) versus process time in minutes for diced beets processed at 220° F.

The invention relates to improved methods of food processing and particularly relates to improving the firmness of fruits and vegetables over commercial processes requiring a blanching step followed by sterilization.

The invention relates to a process to increase or maintain the firmness of fruits and vegetables subjected to thermal sterilization processing which comprises;

a) preparing a fruit or vegetable for sterilization processing;

b) blanching the fruit or vegetable at a temperature in the range of from about 125° F. to about 160° F., preferably from 135° F. to 155° F. and most preferably at temperatures from about 140° F. to about 150° F.; wherein the optimum blanching temperature is determined in advance for the fruit or vegetable as follows:

(1) determining the thermal firmness of the said fruit or vegetable as a function of the blanching temperature and blanch time;

(2) determining the rate of thermal firmness increase with blanch time for a series of blanching temperatures;

(3) selecting blanch temperatures or ranges thereof based on (1) and (2) adapted to provide an optimum firmness increase.

c) holding the blanched fruit or vegetable for a hold period of time up to 120 minutes before sterilization processing;

d) sterilizing the product resulting from step (c).

The thermal firmness and the rate of increase of thermal firmness with blanch temperatures and blanch time can be determined by various methods. A preferred method is to determine the firmness of the fruit or vegetable as a function of the blanching temperature and blanch time and determine the thermal firmness therefrom. By plotting the thermal firmness versus blanch time for a series of blanching temperatures, one determines the rate of thermal firmness increase. When the rate of thermal firmness increase is graphed against blanch temperature a curve is obtained which allows one to conveniently select a blanch temperature adapted to provide an optimum firmness increase.

Another aspect of the invention relates to a method for further enhancing the firmness of fruits or vegetables subjected to thermal processing by combining the above process with treatments using food-grade multivalent salt compounds such as for example magnesium chloride, magnesium oxide, magnesium sulfate, calcium chloride, calcium sulphate, calcium oxide, calcium acetate, calcium citrate and the like; food grade acids selected from the group consisting of citric acid, acetic acid, malic acid, tartaric acid, lactic acid and the like or combinations of both.

It is recognized that the invention can be practiced using a variety of blanch temperature and times preceding further processing steps including thermal sterilization. Thus blanch time as used herein is defined broadly as the time the product is held at the blanch temperature and includes a holding time where the blanched product is held for a defined period prior to sterilization processing.

Another aspect of the invention relates to the use of a low blanching temperature sufficient to activate the natural enzyme which promotes firmness in said fruit or vegetable but lower than the temperature which inactivates such enzyme.

DISCUSSION

Kinetic studies have shown that the rates of thermal softening of thermally processed fruits and vegetables is a two-phase process. There is an initial rapid rate of softening which is followed by a much slower rate of softening.

Huang and Bourne (*J. Texture Studies,* 10:1–23 (1983)) investigated the effect of thermal processing on the firmness of vegetables. These authors measured firmness by placing the sample in a back extrusion cell mounted in the Instron Universal testing machine (cf. Bourne and Moyer 1968). The back extrusion cell used was 10.2 cm I.D. by 12 cm height with a 4 mm annulus. Extrusion speed was 30 cm/min and the downward movement of the plunger was reversed 6 mm from the bottom of the cell. The maximum peak of the recorded force-distance curve, measured in Kilonewtons, was taken as the firmness of the commodity.

Figure 3:
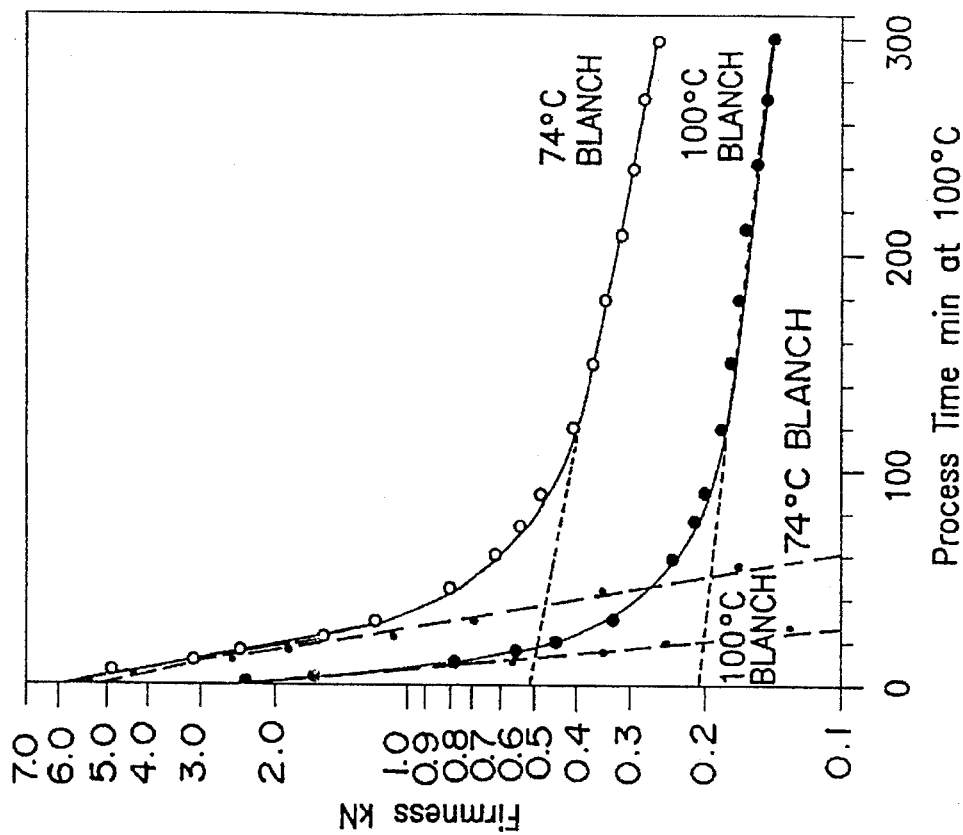
FIG. 3 is a graph comparing a softening curve for Nantes carrot blanched 4 minutes at 74° C. and 100° C. respectively before processing at 100° C.
Figure 2:
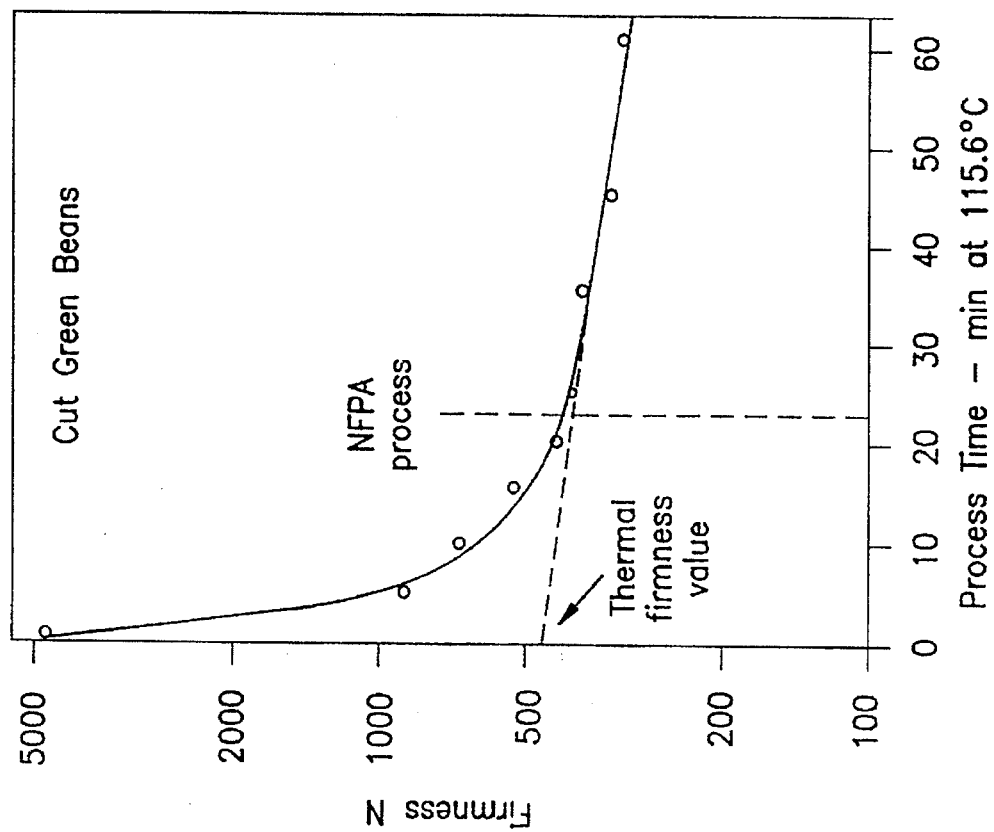
FIG. 2 is a softening point curve where firmness (N) is plotted against processing time in minutes for cut green beans in #303 cans, blanched at 3 minutes at 74° C. (165.2° F.); the National Food Processor recommends a process time of 22 minutes at this temperature.
Figure 4A:
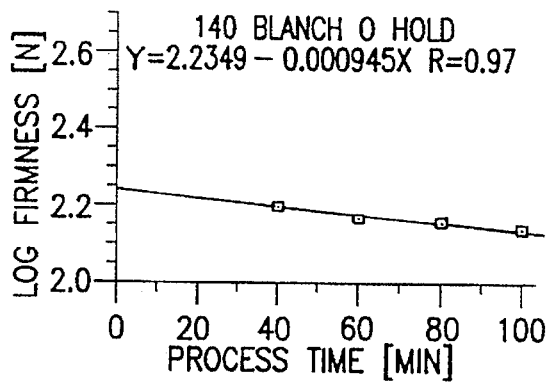
FIG. 4 is a series of graphs for Nantes carrots processed at 250° F. where the log of the firmness is plotted against process time in minutes together with equations for lines of best fit and correlation coefficient R, data used to measure substrate "b" and thermal firmness value (y-axis intersect).
Figure 4B:
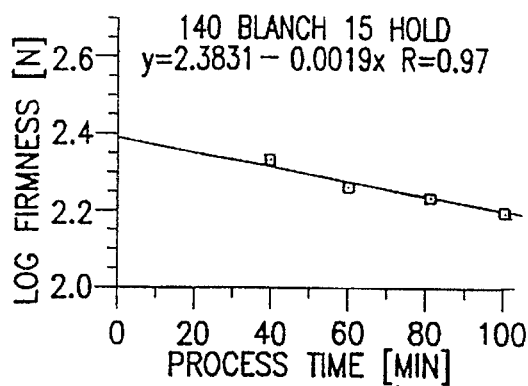
Figure 4C:
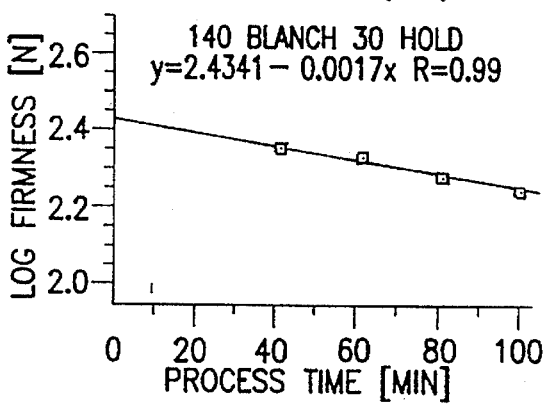
Figure 4D:
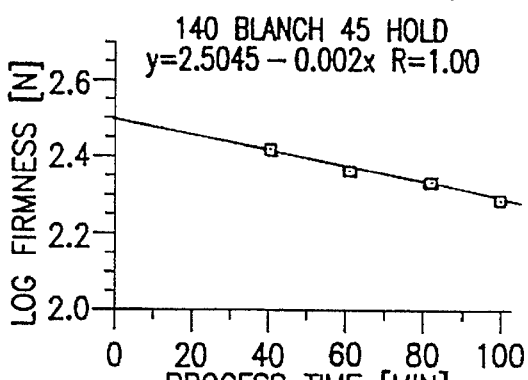
Figure 4E:
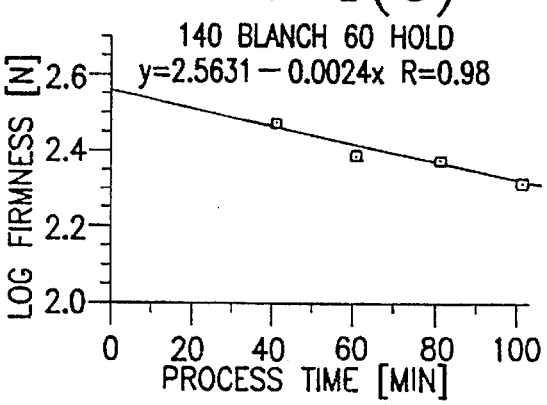
Figure 4F:
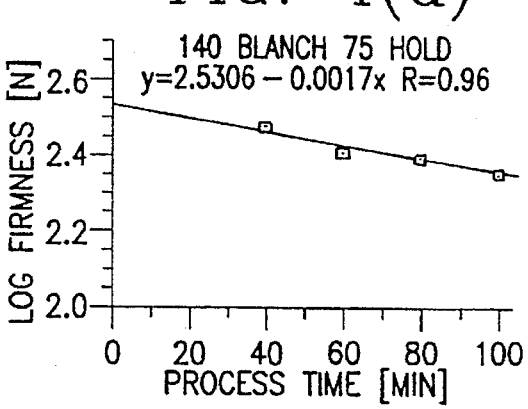
Figure 4G:
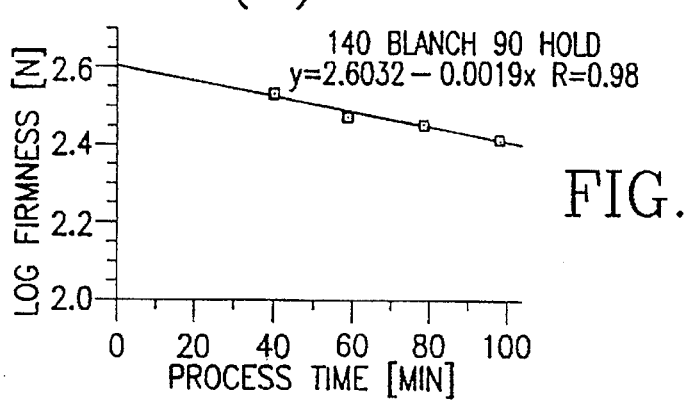

The effect of process time on firmness of fruits and vegetables can be shown by plotting log extrusion force vs. process time. Typical softening curves are shown in FIGS. 1, 2 and 3. The softening curve is characterized by an initial rapid decrease in firmness (negative slope) that is almost linear but which curves off into a second straight line with a shallow negative slope at longer process times. Since a first-order kinetic process is represented by a rectilinear plot on a semilogarithmic scale it is evident that simple first-order kinetics does not apply when lengthy process times are used on canned vegetables. The general shape of this curve is typical for all vegetables studied. Fruits show similar thermal softening curves but the initial rate of softening is completed more rapidly than for vegetables.

The shape of these experimental curves is similar to that obtained for the sum of two independent simultaneous first-order processes occurring at different rates. From analogy with kinetic theory the linear portion of the semilogarithmic curve that is obtained after prolonged heating times (referred to as mechanism 2) gives the apparent softening rate constant for this mechanism. When the linear portion of mechanism 2 is extrapolated back to zero process time and the extrapolated line subtracted from the line above it, the result is a second straight line with a much steeper slope (referred to as mechanism 1) and the slope of this derived line gives the apparent softening rate constant for mechanism 1. This kinetic evidence indicates that the softening of vegetables during thermal processing is composed of two pseudo first-order processes with different rate constants occurring simultaneously. One process is rapid and the other process is slow.

From analogy with kinetic theory for two apparent first order processes we can postulate that the firmness of vegetable tissue is composed of two substrates, "a" and "b" and that substrate "a" softens rapidly by mechanism 1 while substrate "b" softens slowly by a different mechanism (mechanism 2). When the linear portion of mechanism 2 is extrapolated back to zero process time (dotted line in FIG. 1) and this extrapolated line is subtracted from the solid line above it, a second line is obtained as shown by the open circles and dashed line in FIG. 1. The derived dashed line represents mechanism 1 and the slope is its apparent rate constant. The linear portion of the solid line represents mechanism 2 and the slope is its apparent rate constant.

Predicting Process Conditions for Optimum Firmness

As shown in the best mode examples (Table 1, FIG. 6), a plot of the rate of firmness increase (Newtons per minute) versus blanch temperature gives a graph which allows one to select blanch temperatures to produce optimum firmness in the shortest time.

Figure 6:
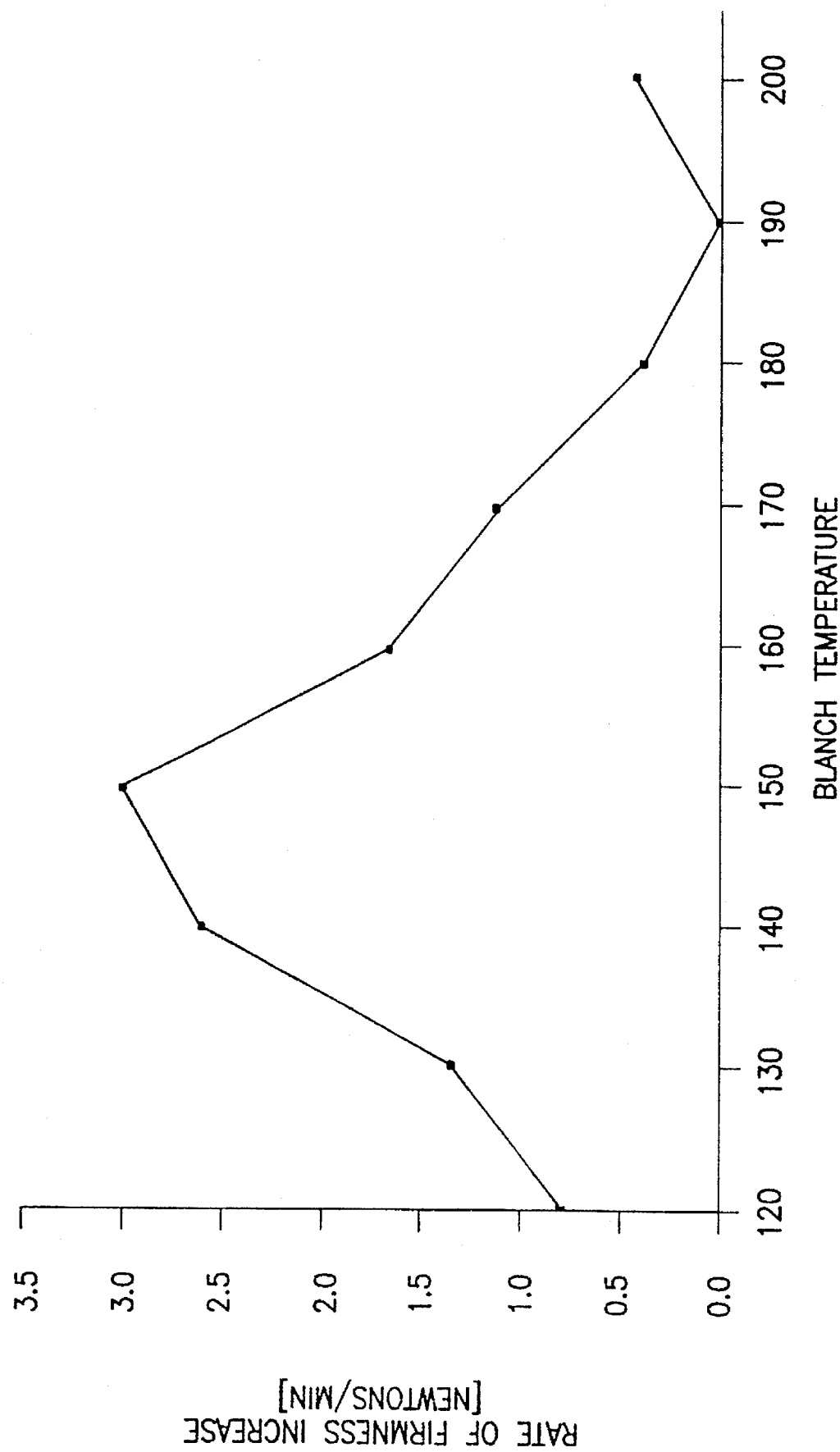
FIG. 6 is a plot of the rate of firmness increase (Newtons per minute) vs. blanch temperature (degrees Fahrenheit) for Chantenay var. carrots. From the graph, optimum blanch temperatures can be selected based on rates of firmness increase.

For example, with reference to FIG. 6, suitable blanch temperature ranges for Chantenay variety of carrots can be selected directly from the graph. Broad ranges are those falling within rate of firmness increase (Newtons/minute) of up to about 1.5, i.e. temperatures of 125° F. to 170° F.; preferred ranges are those with rate of firmness increase of 1.50 or greater (i.e. temperatures of from about 135°–155° F.) and most preferred ranges are those having positive rate increase of 2.5–3.0 (i.e. temperatures of from about 140° to about 150° F.).

It is recognized that because of the differences in the food types to be processed, the temperatures and the holding times sufficient to produce the described rate of firmness increase will vary. Generally the best blanching temperature will be broadly in the range of about 120° F. to 160° F. sufficient to provide a fast rate of firmness increase in Newton's/minute; preferably at about 135° F. to about 155° F.; and most preferably at a temperature from about 140° to about 150° C. sufficient to provide the fastest rate of firmness rate increase. It is recommended that experiments be run to establish graphs for each food type to be processed.

A wide variety of vegetables can be processed according to the present invention. These include for example, carrots, beets, potatoes, wax beans, green beans, cauliflower and the like.

Similarly the invention is applicable to a wide variety of fruits such as peaches, apples, cherries, pears and the like.

The following best mode examples are meant to illustrate the invention; they should not be narrowly construed as to limit the invention.

EXAMPLE 1

Two carrot varieties (Nantes and Chantenay) were washed, topped, diced into 3/8" cubes on an Urschel dicing machine and small pieces removed by passing over a shaking screen. Seven 5 Kg lots of diced carrot were weighed for each blanch temperature. Nine blanch temperatures were used—120°, 130°, 140°, 150°, 160°, 170°, 180°, 190°, 200° F. Each lot was blanched 6 min. in water at the designated temperature, then removed from the water and held with no further heating for a designated hold time, then blanched again 3 minutes at 212° F. in water to stop further enzyme activity and cooled by immersion in cold water. Hold temperatures were 0, 15, 30, 45, 60, 75, 90 minutes.

Sixteen #303 cans were filled from each of the 63 blanch temperature-hold time combinations (7 hold times×9 blanch temperatures). One 60 grain salt tablet was added to each can. The cans were filled with near boiling water, closed, and processed at 250° F. in steam in still retorts with pressure cooling at the conclusion of the designated process time. For each blanch temperature-hold time: 4 cans were processed 40 minutes; 4 cans were processed 60 minutes; 4 cans were processed 80 minutes; 4 cans were processed 100 minutes.

Beginning one week later, the cans were opened and the firmness measured using a back extrusion cell (7.4 cm I.D.×7.8 cm internal height with a 4 mm wide annulus) mounted in an Instron Universal testing machine. This machine plots on a strip chart the force required to extrude the vegetable up through the 4 mm wide annulus between the descending ram and the inside wall of back extrusion cell. This test was replicated eight times for each sample. The maximum force was measured from the Instron chart and the mean value calculated for each treatment.

The logarithm of the mean firmness was graphed against the process time in minutes. A typical series of graphs so obtained is shown in FIG. 4 which gives the data for the 140° F. blanch treatment of Chantenay carrots. The calculated line of best fit to the data points is drawn. The intercept of this line on the vertical axis (firmness at zero process time) is called "thermal firmness".

Figure 5:
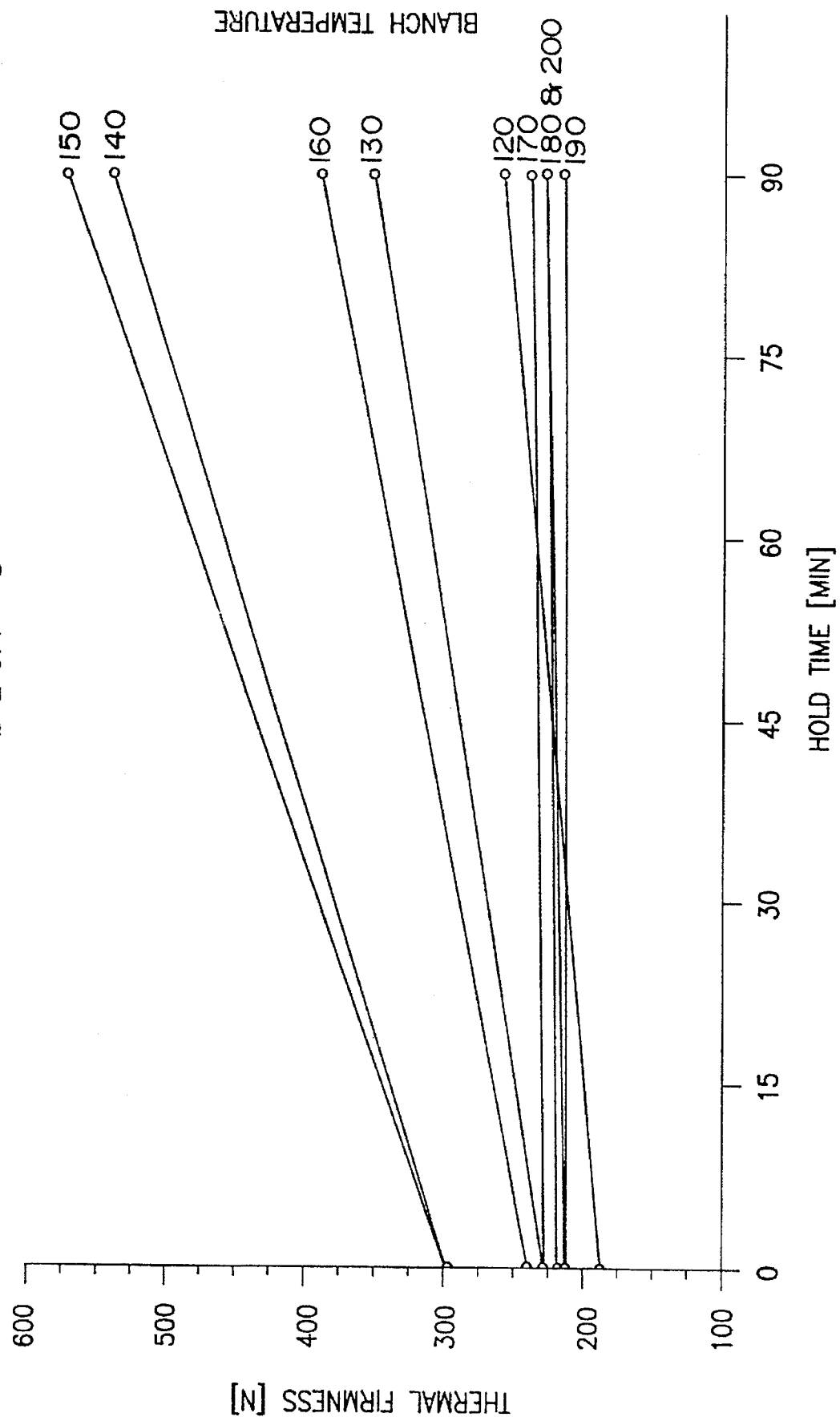
FIG. 5 is a plot of the thermal firmness versus hold time (minutes) after 3 minutes blanching at various temperatures where the slope of lines equal the rate of firmness increase.

The thermal firmness data are then graphed against hold time after blanch and the calculated time of best fit is drawn. A typical graph is shown in FIG. 5 for each of 9 blanch temperatures for Chantenay carrot. The slope of each line is measured and this is the rate of increase in thermal firmness for each blanch temperature (shown at the right hand edge of the figure).

The data obtained from FIG. 5 is then graphed against blanch temperature to give FIG. 6. This figure shows that the rate of increase of thermal firmness increases as the blanch temperature rises from 120° F. to 150° F. and then decreases at temperatures above 150° F. In this case, for Chantenay carrot, 150° F. blanch gives the fastest rate of increase in thermal firmness.

Food processors prefer to keep holding times as short as possible. Graphs like FIG. 6 enable processors to determine a blanch temperature-hold time regime that will give a firmer textured product in the shortest possible time.

Table 1 shows thermal firmness values versus hold times in minutes for Chantenay and Nantes variety carrots.

TABLE 1

Thermal Firmness (Force (N)) Versus Hold Time*

Chantenay Carrots

| Hold Time (minutes) | Blanch Temperatures (°F.) | | | | | |
|---|---|---|---|---|---|---|
| | 120 | 130 | 140 | 150 | 160 | 170 |
| 0 | 199.5 | 195.0 | 245.5 | 239.9 | 251.2 | 223.9 |
| 15 | 182.0 | 234.4 | 346.7 | 363.1 | 269.2 | 234.4 |
| 30 | 218.8 | 316.2 | 371.5 | 436.5 | 263.0 | 218.8 |
| 45 | 234.4 | 316.2 | 501.2 | 467.7 | 302.0 | 245.5 |
| 60 | 213.8 | 323.6 | 501.2 | 457.1 | 346.7 | 245.5 |
| 75 | 229.1 | 309.0 | 467.7 | 524.8 | 371.5 | 229.1 |
| 90 | 281.8 | 331.1 | 489.8 | 549.5 | 389.0 | 234.4 |

Chantenay Carrots

| Hold Time (minutes) | Blanch Temperatures (°F.) | | |
|---|---|---|---|
| | 180 | 190 | 200 |
| 0 | 213.8 | 204.2 | 218.8 |
| 15 | 213.8 | 204.2 | 195.0 |
| 30 | 223.9 | 213.8 | 213.8 |
| 45 | 234.4 | 229.1 | 223.9 |
| 60 | 218.8 | 234.4 | 199.5 |
| 75 | 229.1 | 199.5 | 204.2 |
| 90 | 218.8 | 199.5 | 195.0 |

Nantes Carrots

| Hold Time (minutes) | Blanch Temperatures (°F.) | | | | | |
|---|---|---|---|---|---|---|
| | 120 | 130 | 140 | 150 | 160 | 170 |
| 0 | 169.8 | 195.0 | 169.8 | 204.2 | 269.2 | 245.5 |
| 15 | 269.1 | 208.9 | 239.9 | 309.0 | 302.0 | 263.0 |
| 30 | 275.4 | 218.7 | 269.2 | 346.7 | 363.1 | 263.0 |
| 45 | 281.8 | 295.1 | 316.2 | 380.2 | 398.1 | 257.0 |
| 60 | 338.8 | 295.1 | 363.1 | 446.7 | 380.2 | 302.0 |
| 75 | 309.0 | 309.0 | 338.8 | 457.1 | 436.5 | 263.0 |
| 90 | 426.6 | 380.2 | 398.1 | 467.7 | 426.6 | 218.8 |

Nantes Carrots

| Hold Time (minutes) | Blanch Temperatures (°F.) | | |
|---|---|---|---|
| | 180 | 190 | 200 |
| 0 | 223.9 | 173.8 | 166.0 |
| 15 | 186.2 | 169.8 | 173.8 |
| 30 | 213.8 | 182.0 | 169.8 |
| 45 | 229.1 | 166.0 | 154.9 |
| 60 | 204.2 | 166.0 | 169.8 |
| 75 | 213.8 | 182.0 | 162.2 |
| 90 | 223.9 | 173.8 | 162.2 |

*Time Interval Minutes between end of blanch and beginning of thermal sterilization.

Table 1 shows that a conventional process of a 200° F. blanch (no hold time) give thermal firmness values of 219N and 166N respectively for Chantenay and Nantes variety carrots with no increase of firmness for holding times of 30 minutes after blanching. However, when the carrots are blanched at 150° F. the respective thermal firmness values are 240N and 204N and these increase to 437N and 346N at 30 minutes hold and to 550N and 460N at 90 minutes hold time. Thus a low temperature blanch temperature plus hold time before sterilization gives a marked increase in firmness. FIG. 5 shows a plot of thermal firmness versus hold time (minutes) for Chantenay carrots. It is seen that firmness increases most rapidly for 150° F. and 140° F. blanched carrots, less rapidly for 130° and 160° blanch. There is only slight increase of thermal firmness with hold time for the remaining blanch temperatures.

FIG. 6 is a graph of rate of firmness increase (newtons/minute) versus blanch temperature for Chantenay carrots. Both FIGS. 5 and 6 allow one to select optimum blanch temperatures and hold times for optimum firmness.

Referring to FIG. 6 it is seen that desirable blanch temperatures for Chantenay carrot are broadly from about 125° F. to about 160° F., preferably from about 135° to 155° F. and most preferably from about 140° to about 150° F.

EXAMPLE 2

In an experiment similar to that of Example 1, Danvers variety of carrots was evaluated using 4° F. increments in blanch temperatures over the range of 140° to 160° F. to more critically define this range. The results are shown in Table 2 and FIG. 8.

TABLE 2

Firmness of Canned Danvers Carrot (Newtons Force)

| Hold Time (minutes) | Blanch Temperatures (°F.) | | | | | |
|---|---|---|---|---|---|---|
| | 140 | 144 | 148 | 152 | 156 | 160 |
| 0 | 247.6 | 206.0 | 191.0 | 234.9 | 259.2 | 254.3 |
| 15 | 294.6 | 333.3 | 303.2 | 339.0 | 337.5 | 264.7 |
| 30 | 364.6 | 327.2 | 376.5 | 368.2 | 359.5 | 270.7 |
| 45 | 452.7 | 444.6 | 393.7 | 402.1 | 394.7 | 287.4 |
| 60 | 513.7 | 452.6 | 413.0 | 405.7 | 352.7 | 299.6 |
| 75 | 424.1 | 449.4 | 400.5 | 432.4 | 372.2 | 293.3 |
| 90 | 449.1 | 474.2 | 437.3 | 393.2 | 364.5 | 304.1 |

Figure 8:
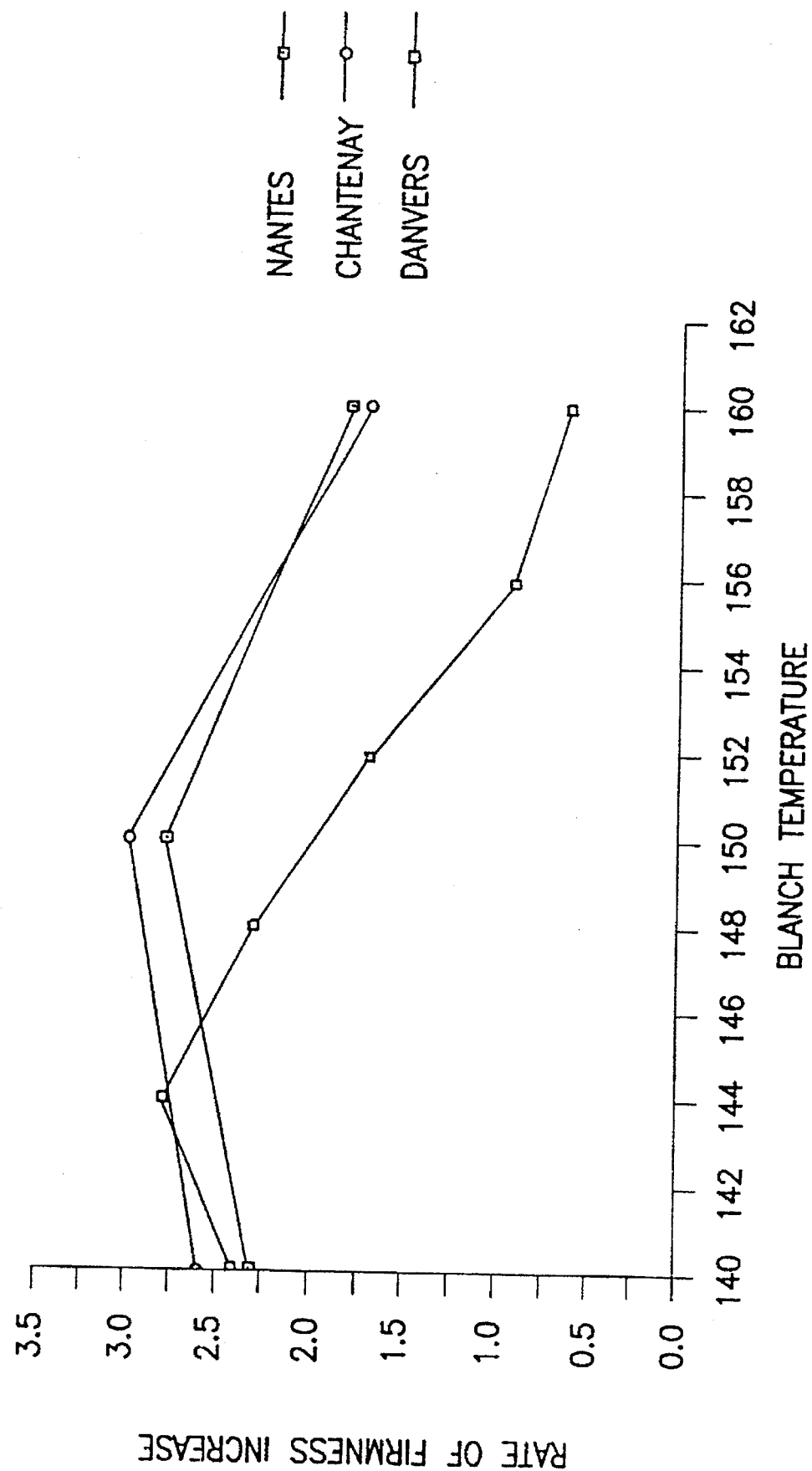
FIG. 8 is a graph of rate of firmness increase versus blanch temperature for three varieties of carrots, namely Nantes, Danvers and Chantenay.

From the above it is seen that the 144° F. blanch temperature gave the fastest rate of increase in firmness; however, temperatures of 140°, 148° and 152° F. also gave high values for the rate of firmness increase. FIG. 8 also shows a rate of firmness increase for two other carrot varieties (Nantes, Chantenay) in the narrower blanch temperature range of 140° F. to 160° F.

EXAMPLE 3

Ten Kg lots of Danvers variety carrots (unpeeled) were blanched 15 minutes and 30 minutes at 150° F. They were then peeled, sliced and diced and sterilized for 24 minutes at 250° F. in #303 cans (21 cans per treatment). For comparison purposes a control was blanched 4 minutes at 212° F. with no hold time before peeling, cutting and sterilization. The firmness results (newton's) are shown in Table 3.

TABLE 3

Firmness of Canned Carrot (in Newton's Force)

| Treatment Blanch Temp. °F. | Type | Firmness (N) & SD |
|---|---|---|
| 4 min. at 212° F. (control) | slices | 214 N ± 11.7 |
| 15 min. at 150° F. | slices | 255 N ± 10.7 |
| 30 min. at 150° F. | slices | 328 N ± 14.9 |
| 8 min. at 212° F. | dices | 202 N ± 8.1 |
| 15 min. at 150° F. | dices | 268 N ± 10.9 |
| 30 min. at 150° F. | dices | 317 N ± 15.3 |

From Table 3, it is seen that a 150° F. blanch for 15 and 30 minutes gives a marked increase in firmness as compared with conventional processing of 212° F. for 4 minutes.

EXAMPLE 4

In an experiment similar to Example 1, three varieties of snap beans were processed to establish the blanch temperature that gives the fastest rate of increase of thermal firmness. The varieties were Labrador (a green bean), BBL-47 (a green bean) and Bonanza (a wax bean). Example 1 protocol was used except for the following differences:

1) the beans were cut into 1½ inch lengths;
2) hold times of 0, 15, 30, 45 and 60 minutes were used;
3) blanch temperatures were 120°, 130°, 140°, 145°, 150°, 160°, 170° and 180° F.

Figure 7:
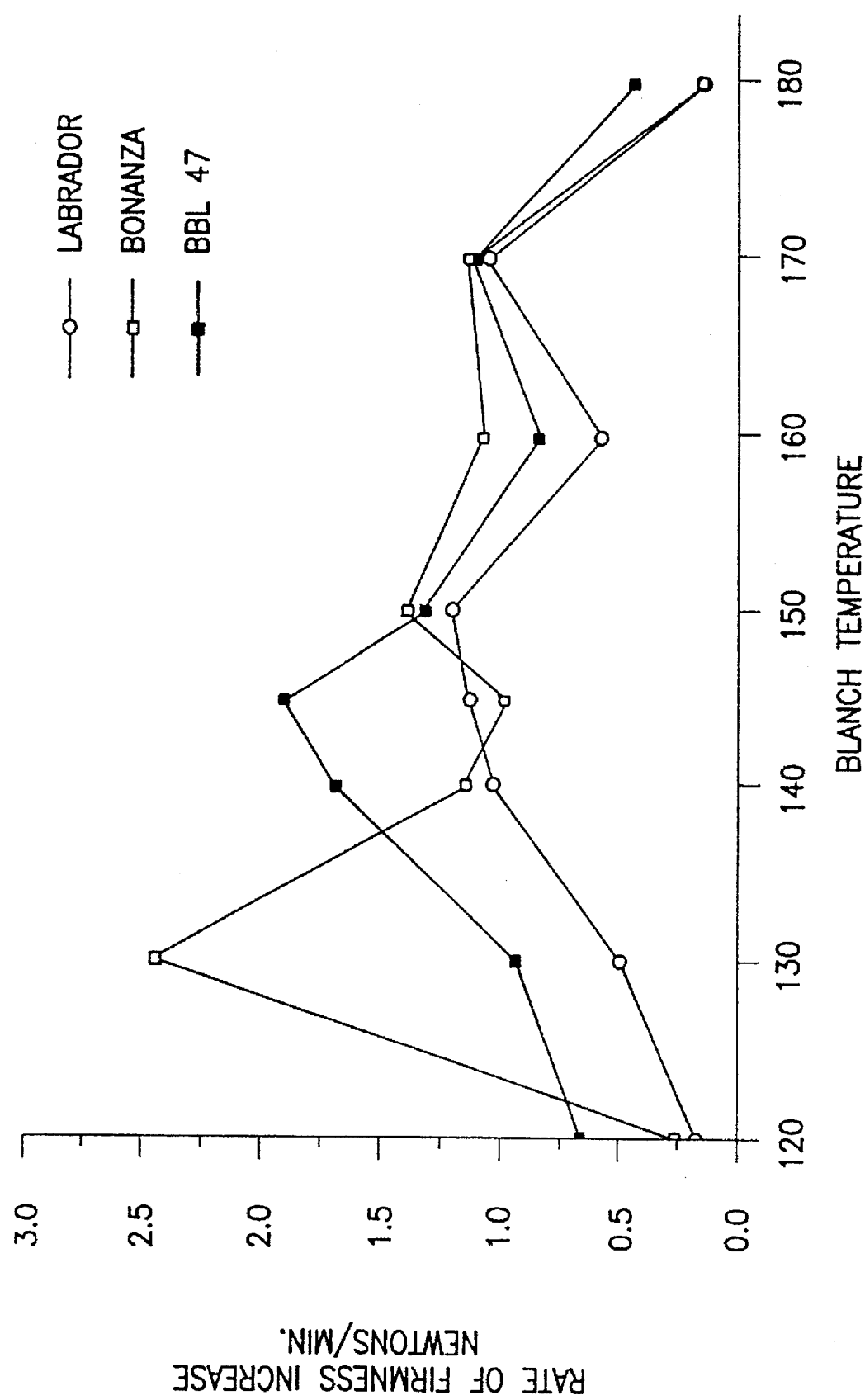
FIG. 7 is a graph of rate of firmness increase versus blanch temperature for three varities of green beans, namely Labrador, Bonanza and BBL 47.

The results are shown graphically in FIG. 7 which is a graph of the rate of firmness increase versus blanch temperature. The difference in the maximum rate of firmness increase is noted i.e. 130° F. for Bonanza; 145° F. for BBL-47 and 150° F. for Labrador.

EXAMPLE 5

Heads of cauliflower were broken apart into curds, then blanched 10 minutes at 145° F. in hot water containing 6 grams of citric acid per liter, hold for 20 minutes, then sterilized in No. 303 cans for 22 minutes at 240° F. As a control some of the curds were blanched 4 minutes at 200°–210° F. then sterilized in the same manner with no hold time. The mean value of 8 replicate texture measurements showed that the firmness (newton's force) for the 145° F. blanched product was 127 as opposed to 65 for the control.

EXAMPLE 6

Small white potatoes (B grade) were peeled in an abrasive rotary peeling machine, then blanched 15 or 30 minutes at 145° F., filled into No. 303 cans and sterilized 26 minutes at 250° F. in a still retort. A control batch of potatoes was sterilized at 250° F. for 26 minutes without blanching. The blanched potatoes gave a mean firmness values of 405 and 431N as opposed to 378N for the control.

EXAMPLE 7

Two types of sweet cherries (Sodus-light variety and Duron II—a dark variety) were blanched 5 minutes at 140° F., then held for 30, 60, 120 minutes before being canned in 20 percent sugar syrup and sterilized at 212° F. for 20 minutes. For controls, some cherries were canned with no blanch treatment which is the conventional commercial procedure. Firmness was measured as the force in newtons to push Dunkley cherry pitters simultaneously through 30 cherries. The firmness is shown in Table 3.

| Treatment, Blanch Temp, °F. | Hold Time (minutes) | Firmness Sodus | (Newtons Force) Durone II |
|---|---|---|---|
| Control (no blanch) | — | 87 | 97 |
| 140° F. | 30 | 116 | 114 |
| 140° F. | 60 | 114 | 146 |
| 140° F. | 120 | 128 | 164 |

Normally, cherries are not blanched but processed in syrup. It is seen that low temperature blanch (140° F.) with 30, 60 and 120 minutes hold times gives increased firmness.

EXAMPLE 8

Freestone peaches were cut in halves and blanched 20 minutes in water held at 145°–150° F., held for 2 hours and then canned in 25 percent sugar syrup using a sterilization of 20 minutes at 212° F. Control peaches were canned with no blanch treatment which represents conventional commercial practice. Firmness was measured in a back extrusion cell. Four days later another lot of the same peaches were blanched 30 minutes and canned immediately with no hold time before sterilization. The peaches blanched 20 minutes at 145° F. with a 2 hour hold gave a firmness (newton's force) of 221, while those blanched 30 minutes at 145° F. with no hold gave a firmness of 237. Both results exceeded the control firmness of 174N.

EXAMPLE 9

Golden Delicious apples were blanched 30 minutes (9A) and 60 minutes (9B) at 145° F. in water, then peeled, sliced and canned in 20 percent sugar syrup with a sterilization of 20 minutes at 212° F. Control apples were canned with no blanch which is the conventional process. Firmness was measured in the back extrusion cell. The firmness in newton's force, 223 for sample 9A and 265 for 9B, greatly exceeded the control of 89.

EXAMPLE 10

It is well known in the food processing industry that the addition of compounds such as salts of calcium or magnesium impart firmer texture to processed vegetables and fruits. Two vegetables (green beans and potatoes) and one fruit (peaches) were canned with and without 0.07 percent added calcium chloride after being subjected to a conventional commercial blanch or a blanch in the 140°–150° F. range as described in the prior art examples. Firmness results using a back extrusion cell are given in the following table:

TABLE 5

| Product | Blanch Temperature | Hold Time (minutes) | Firmness Without Calcium | With Calcium |
| --- | --- | --- | --- | --- |
| Green beans | 205° F. | — | 218 | 266 |
| (BBL-47) | 145° F. | 30 | 476 | 646 |
| Potatoes | no blanch | (control) | 378 | 362 |
| (white) | 145° F. | 15 | 405 | 402 |
|  | 145° F. | 30 | 431 | 407 |
| Peaches | no blanch | (control) | 174 | 221 |
| (Freestone) | 20 min. @ 145° F. | 120 | 221 | 269 |
|  | 30 min. @ 145° F. | 0 | 237 | 289 |

The results in Table 5 above, show that a firmer product is produced in both green beans and peaches using either a 145° F. or a calcium treatment. A synergistic effect is noted for the combined treatment using both 145° F. blanch and calcium salt. Note the firmness of green beans increases to 646 with calcium and blanch versus 476 (blanch alone) as compared with 266 (calcium only) and 218 (no calcium), for the 205° F. blanch control. These limited tests showed no synergism for potatoes.

EXAMPLE 11

It is known in the food industry that the heating regime needed to sterilize foods with a pH below about 4.5 is much less rigorous than for foods with a pH above 4.5 because heat resistant bacterial spores cannot grow below pH 4.5. This example is to show the effect of the combination of a milder heat sterilization with the addition of sufficient acid to bring the pH of a food having a pH higher than 4.5 to a pH of below 4.5.

Carrots, green beans and cauliflower were given a conventional commercial blanch treatment, or a blanch in the 145°–150° range before processing with, and without, calcium and sufficient acid to reduce the pH below 4.5. The products without the addition of acid were given a commercial high temperature sterilization. The products with added acid were sterilized for 20 minutes at 212° F. which is sufficient to obtain commercial Sterility because the pH was below 4.5. The results are shown in Table 6.

Dramatic synergism is noted for carrots, green beans and cauliflower. For carrots an 8 minute blanch at 212° F. followed by sterilization using both calcium and citric acid gives a firmness of 2168 newton's force. In contrast, a blanch at 150° F. for 15 or 30 minutes using both calcium and citric acid gives firmness values of 3058 and 3485 newton's force. The combination of calcium plus citric acid and 145° F. blanch and 20 min. (212° F.) sterilization gives a 2168 firmness for cauliflower and 4376 for green beans.

TABLE 6

Effect of Added Calcium and Acid on Firmness

| Product | Blanch | Sterilization |
| --- | --- | --- |
| carrots, Danvers sliced | 8 min. at 212° F. | 24 min. at 250° F., still retort |
|  | 8 min. at 212° F. | — |
|  | 8 min. at 212° F. | 20 min. at 212° F., still retort |
|  | 15 min. at 150° F. | 24 min. at 250° F., still retort |
|  | — | 20 min. at 212° F., still retort |
|  | 30 min. at 150° F. | 24 min. at 250° F., still retort |
|  | — | 20 min. at 212° F. |
| green beans RBL-47 | 6 min. at 172° F. | 8.5 min. at 250° F. in Steritort |
|  | 4 min. at 145° F. (hold 30 min.) | — |
|  | — | 20 min. at 212° F., still retort |
| cauliflower | 6 min. at 212° F. | 22 min. at 240° F., still retort |
|  | 10 min. at 145° F. (hold 30 min.) | — |
|  | — | 20 min. at 212° F. in water |

| Product | Additives | Firmness - Newtons Force |
| --- | --- | --- |
| carrots, Danvers sliced | none | 202 |
|  | +Ca | 279 |
|  | +Ca + citric acid | 2168 |
|  | none | 268 |
|  | +Ca | 362 |
|  | +Ca + citric acid | 3058 |
|  | none | 317 |
|  | +Ca | 440 |
|  | +Ca + citric acid | 3485 |
| green beans RBL-47 | none | 336 |
|  | none | 454 |
|  | +Ca + vinegar | 4376 |
| cauliflower | none | 65 |
|  | none | 127 |
|  | +Ca + citric acid | 2168 |

What is claimed is:

1. A process for producing canned fruits and vegetables which are subjected to sterilization after canning, which process comprises, before canning, blanching a fruit or vegetable different from green beans, wax beans and cauliflower at a temperature of from about 125° F. to 155° F. for a time sufficient to cause said fruit or vegetable to remain firmer after sterilization as compared to said same fruit or vegetable after canning and subsequent sterilization without said blanching step.

2. A process of claim 1 wherein the blanching temperature is from about 140° F. to about 150° F.

3. The process of claim 1 wherein the blanching temperature is from about 140° to 150° F., food grade calcium salt and food grade acid are added to the fruit or vegetable prior to sterilization, the food grade calcium salt is calcium chloride and the food grade acid is selected from the group consisting of acetic acid, citric acid, lactic acid, malic acid, tartaric acid and mixtures thereof.

4. The process of claim 1 wherein the fruit or vegetable is potatoes.

5. The process of claim 1 wherein the fruit or vegetable is peaches.

6. The process of claim 1 wherein the fruit or vegetable is apples.

7. A process for producing canned fruits or vegetables which are subjected to sterilization after canning, which process comprises, before canning, blanching a fruit or vegetable at a temperature of from about 125° F. to 155° F. for a time sufficient to cause said fruit or vegetable to remain firmer after sterilization as compared to said same fruit or vegetable after canning and subsequent sterilization without said blanching step and enhancing the firmness of the sterilized fruit or vegetable by adding a food grade acid to the fruit or vegetable prior to the sterilization to reduce pH below 4.5.

* * * * *